(12) United States Patent
Cava

(10) Patent No.: US 7,620,627 B2
(45) Date of Patent: Nov. 17, 2009

(54) GENERATING KEYWORDS

(75) Inventor: William Cava, New Boston, NH (US)

(73) Assignee: Lycos, Inc., Waltham, MA (US)

( * ) Notice: Subject to any disclaimer, the term of this patent is extended or adjusted under 35 U.S.C. 154(b) by 93 days.

(21) Appl. No.: 11/590,668

(22) Filed: Oct. 31, 2006

(65) Prior Publication Data

US 2007/0226202 A1 Sep. 27, 2007

Related U.S. Application Data

(60) Provisional application No. 60/732,464, filed on Nov. 1, 2005.

(51) Int. Cl.
*G06F 17/30* (2006.01)
*G06F 7/00* (2006.01)

(52) U.S. Cl. .................................. 707/3; 707/4; 707/10

(58) Field of Classification Search ...................... None
See application file for complete search history.

(56) References Cited

U.S. PATENT DOCUMENTS

| 6,691,108 B2 * | 2/2004 | Li ................................. 707/3 |
| 2007/0055649 A1 * | 3/2007 | Tsuzuki et al. ................. 707/2 |

* cited by examiner

*Primary Examiner*—Baoquoc N To
(74) *Attorney, Agent, or Firm*—Fish & Richardson P.C.

(57) ABSTRACT

Generating keywords for use in searching content includes receiving a keyword, obtaining categories that corresponds to the keyword from a catalog file, receiving a selection corresponding to at least one of the categories, and generating keywords associated with the selection. The catalog file includes mappings of keywords to categories, and obtaining categories that correspond to the keyword includes retrieving mapped categories from the catalog file that correspond to the keyword.

18 Claims, 3 Drawing Sheets

LYCOS Web People Discussion News Yellow Pages Products Multimedia     Home | Email | Search Advertising SEARCH THE WEB:
[notebook memory upgrade] (Go Get It!) ~62

Advanced Search:   Block Offensive Content:   Always, Sometimes, Never

SPONSORED LINKS (info)
- Notebook Memory Upgrade
  Discounted Laptop Memory Upgrades with Lifetime Warranty. Order Now!.
  www.4allmemory.com

- Laptop Memory
  Find the right memory fast. 100% Compatible. Lifetime Warranty.
  www.kingston.com

- Dell Notebook Memory
  Up to $500 off at Dell Home Offer ends 3/30. Details.
  www.dell4me.com WEB RESULTS: Showing Results 1 thru 10 of 436,9000 (info)

1. Laptop Memory Upgrade Guide – How to Upgrade computer laptop Memory?
   Laptop Memory Upgrade www.laptopmemoryupgrade.com...are available for Dell, Hitachi,
   Toshiba, HP, IBM and all other laptio and notebook types.
   www.laptopmemoryupgrade.com 2. Buy computer memory RAM, Memory Types, Memory upgrades online
   How to install Rambus Rimm? How to find and install HP PrinterMemory upgrade? How to install
   Notebook memory Upgrade? Where to Buy Memory?
   www.buycomputermemory.com

FIG. 2

GENERATING KEYWORDS

CROSS-REFERENCE TO RELATED APPLICATION

This patent application claims priority to U.S. Provisional Application No. 60/732,464, which was filed on Nov. 1, 2005. The contents of U.S. Provisional Application No. 60/732,464 are hereby incorporated by reference into this application as if set forth herein in full.

TECHNICAL FIELD

This patent application relates generally to generating keywords and, more particularly, to generating keywords for use in searching content.

BACKGROUND

A search engine may be used to locate information on the World Wide Web (Web). Search engines include databases that index words from pages or other documents on numerous Web sites. As is well known, a user enters a search term; the search engine searches its database for document(s) containing the search term; and the search engine displays a list of documents (e.g., hyperlinks) that contain those search terms.

Search engines use computer programs, such as robots, spiders and crawlers, to trace hyperlinks across the Web, and thereby populate their databases. When such computer programs move from one Web site to another, the programs index Web documents from various Web sites, and send the results back to a database. The database thus can become quite large. As a result, when a search term or keyword is entered into a search engine, the results of the search may include several thousand hyperlinks, or "hits".

Web companies may incorporate content from advertisers in the results their search engines generate. An advertiser may, for instance, pay a search engine company to feature their content prominently in search results. A search engine may present paid listings on a results page in a format closely that resembles regular search results. Typically, these paid listings relate somehow to the initial search query (keyword(s)), and are returned based, in part, on the initial search query. It therefore behooves companies to incorporate search terms in their Web content that match keywords input to a search engine.

SUMMARY

This patent application describes methods and apparatus, including computer program products, for generating keywords for use in searching content.

In general, this patent application describes a method for generating keywords for use in searching content. The method includes receiving a keyword, obtaining categories that corresponds to the keyword, receiving a selection corresponding to at least one of the categories, and generating keywords associated with the selection. The method may also include one or more of the following features.

The keyword may be received via a graphical user interface (GUI). The categories may be obtained from a catalog file. The catalog file may comprise mappings of keywords to categories. Obtaining categories that correspond to the keyword may comprise retrieving mapped categories from the catalog file that correspond to the keyword.

Categories that correspond to the keyword may be output. Keywords may be ranked within categories. Rankings of keywords may correspond to frequencies of hits within categories. Generating the keywords may comprise obtaining keywords that correspond to the selection. The keywords may be incorporated into searchable content.

In general, this patent application also describes a method of generating a keyword database. The method comprises mapping keywords to associated categories, where the categories are obtained from searchable content that includes the keywords, ranking keywords within the associated categories, and storing ranked keywords along with associated categories. The method may also include one or more of the following features.

Ranking the keywords may include determining a number of hits of keywords relative to categories, and weighting the keywords based on the number of hits.

An article of manufacture may store instructions that are executable to perform all or part of each of the foregoing methods and features. The article of manufacture may include one or more machine-readable media that store instructions that are executable by one or more processing devices to implement the methods and/or features.

The details of one or more examples are set forth in the accompanying drawings and the description below. Further features, aspects, and advantages will become apparent from the description, the drawings, and the claims.

DESCRIPTION OF THE DRAWINGS

FIG. 2 is a block diagram of a graphical user interface (GUI) that includes search results generated by a search engine.

DETAILED DESCRIPTION

Figure 1:
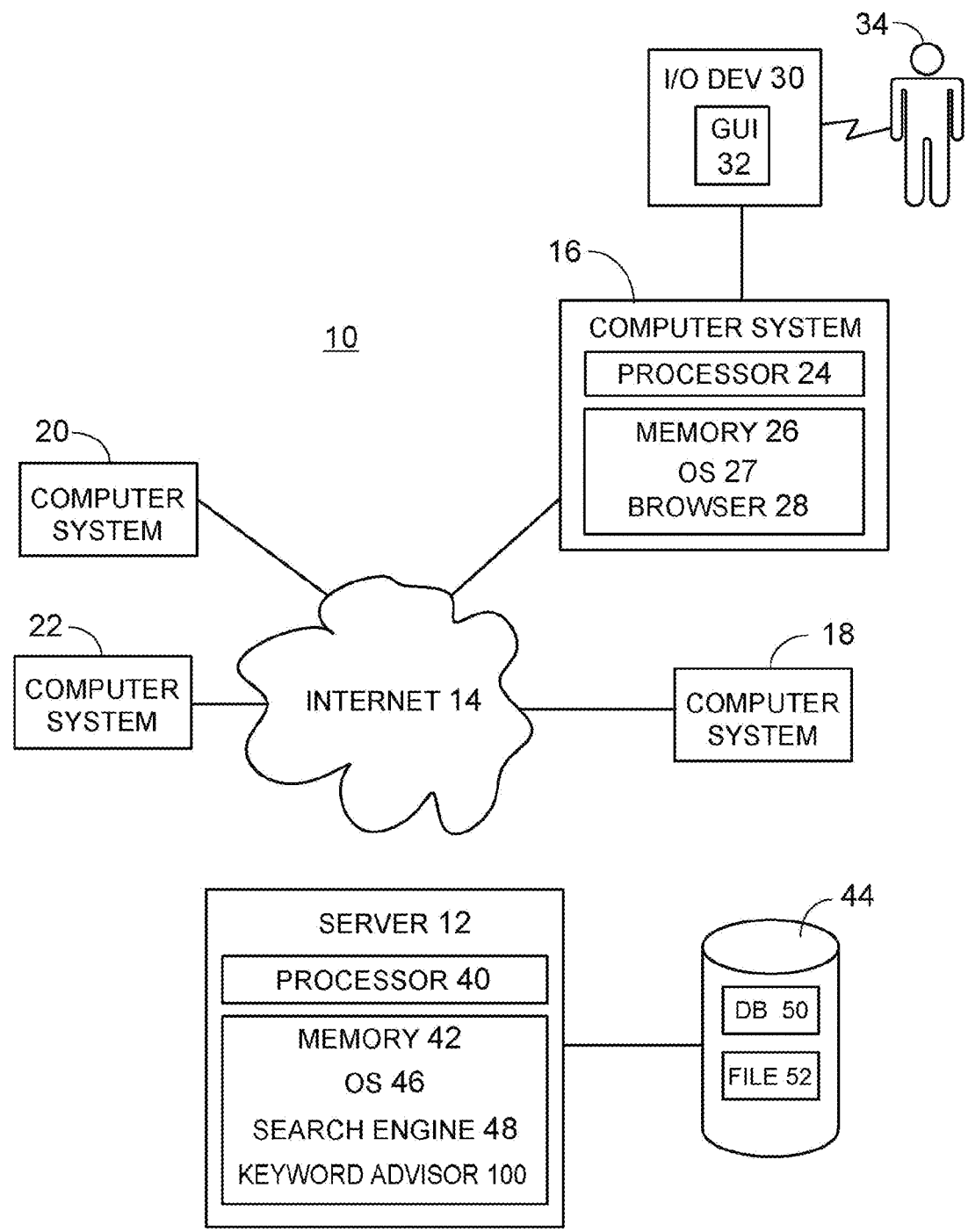
FIG. 1 is a block diagram of a network on which the processes described herein may be implemented.

FIG. 1 shows a network 10, over which network devices can communicate. Network 10 may be an IP-enabled network, and may include a local area network (LAN), such as an intranet, and/or a wide area network (WAN), which may, but need not, include the Internet. Network 10 may be wired, wireless, or a combination of the two.

In this example, network 10 may include one or more devices 16, 18, 20 and 22 that are capable of browsing the Web using a search engine, such as that provided by Lycos®. The devices may be desktop or laptop computers, personal digital assistants (PDAs), cellular or standard telephones, video-gaming devices, or the like. Although only four such devices are shown in network 10, any number or types of devices may be included.

Network 10 may also includes multiple other devices (not shown), including server 12. These other devices may have any type of architecture and/or programming that enables communication over network 10. One such device, namely server 12, may include one server 12 or multiple servers, e.g., a server farm.

Server 12 may be any type of processing device that is capable of receiving and storing data, and of communicating with devices 16, 18, 20 and 22 over network 10. Server 12 includes one or more processor(s) 40 and memory 42 that stores computer programs that are executable by processor(s) 40. In this regard, memory 42 stores one or more computer programs for implementing an operating system 46, a search engine 48, and a keyword advisor process 100 (described below). One or more storage devices 44 associated with server 12 stores a database 50 and catalog file 52, which are described below. FIG. 1 shows these storage devices as external to server 12; however, they may be internal or a combination of internal and external.

In this implementation, devices 16, 18, 20 and 22 are computer systems and server 12 is in communication with those computer systems over Internet 14. It is noted that the communication may be over any type of network, including any of those noted above, and that Internet 14 is merely used as an example. Each computer system, such as computer system 16, includes one or more processor(s) 24 and memory 26. In this implementation, memory 26 stores an operating system 27 and a Web browser (browser) 28, which are executable by processor(s) 24 to perform at least part of the processes described herein. One example of a Web browser is Internet Explorer® provided by Microsoft®. Each computer system may include an input/output (I/O) device 30, through which a user 34 interacts with the computer system. The I/O device may include a keyboard, mouse, screen, and the like.

Browser 28 can be used to access search engine 48. Search engine 48, and/or processes associated with search engine 48, makes use of robots, spiders, crawlers, and various other computer programs to trace hyperlinks across the Web in order to populate database 50. In more detail, such computer programs move from one Web site to another, index Web documents at those sites, and send indexed results back to database 50, which here resides on the storage device 44 (or in memory 42). The results stored in database 50 are later used to respond to a search query. That is, a browser provides a search query, e.g., one or more keywords, to search engine 48. In response, search engine 48 searches its database 50 for Web documents that match the query or that are close to, but may not exactly match, the query. Search engine 48 displays a results list in the browser.

An example of a results list Web page is shown in FIG. 2. As shown in FIG. 2, an exemplary screen 60 is displayed by the search engine after it performs a search. In operation, search terms or keywords 62, such as "notebook," "memory," and "upgrade," are entered into the search engine by a user 34 through a browser. Search engine 48 receives these keywords, scours database 50 for potential matches, and presents its results in "Web Results" list 64, which is displayed to user 34 on GUI 32.

In addition to Web results list 64, search engine 48 presents "sponsored links" 66. In this example, sponsored links 66 are "pay-per-click" advertisements; however, the sponsored links may be any type of Web-based advertising. The advertising corresponds to the search query (e.g., keyword(s)) input to the search engine by user 34. That is, the advertising relates to the search query in some way. For example, user-entered keyword(s) 62 may match a theme or category of the advertiser's product or service. Search engine 48 thus retrieves advertising in a manner similar to other search results. That is, search engine 48 retrieves advertising that matches, or somehow relates to, an input search query.

Thus, a goal of a "pay-per-click" Web advertiser is to pick keywords that represent their product/service directly or indirectly so that a search performed by a user hits at least one of the advertiser's keywords. That is, such advertisers attempt to pick keywords that will result in their advertising being retrieved in as many Web searches as possible. The advertisers then incorporate these keywords into their advertising (e.g., Web pages, banners, or the like). The keywords may be incorporated directly into the content of the advertising or into non-visible metadata or other content that is associated with the advertising. Process 100 (FIG. 3), which is described below, may be used to suggest keywords that advertisers may incorporated into their advertising.

Process 100 is a keyword expansion application that may be used by Web advertisers, such as pay-per-click advertisers, or others. For example, process 100 may be used to facilitate management and optimization of advertising campaigns that are conducted over the Web. To this end, process 100 suggests keywords to an advertiser within a context of one or more predefined categories. In more detail, process 100 identifies appropriate categories for a keyword by searching a category catalog file and determining which categories correspond to the search terms. Process 100 performs intelligent hierarchy pruning and collapsing to return a keyword list from the categories that best match the search terms, along with weights indicating a confidence score (described below). Process 100 eliminates contextually irrelevant phrases from the original keyword and performs keyword expansion on the categories with the highest scores to generate the keywords.

In more detail, storage device 44 stores a category catalog file 52. The category catalog file 52 may be defined beforehand, and contains mappings of keywords to categories, with one or more keywords mapping to multiple categories. In this example, a category refers to a specifically-defined division in a system of classification, such as a class, a general class of ideas, terms, or things that mark divisions or co-ordinations within a conceptual scheme. A conceptual theme refers to a general idea derived or inferred from specific instances or occurrences. For example, a keyword "banking" can map to a "financing" category, a "savings account" category, a "money market" category, and so forth.

In this implementation, category catalog file 52 is generated by performing keyword search(es) and determining a category from a Web page or other document on which the keyword is found. For example, software may determine the subject matter of the Web page and map the keyword to that subject matter (category) in the category catalog file. Self-describing tags, metadata, or other information associated with the Web page may be used to determine the subject matter of the Web page. Alternatively, the mappings may be generated manually or interactively. The mappings in category catalog file 52 also includes a "confidence score". The confidence score represents an indication of how often any given keyword is "hit" within a category, e.g., a frequency of hits within a category. For example, within the category of banking, the phrase "interest rate" may be hit most often and, thus, may be given a high confidence score. Within any given category, mapped keywords may be ranked or weighted using the confidence score.

For advertisers to be successful in drawing people to their advertising/Web page(s), the keywords they select should be in line with a theme or category of the advertisers' product/service. A goal is to pick keywords that represent the product/service both directly or indirectly so when a user is performing a search, the user selects one of the advertiser's keywords and, as a result, retrieves the advertiser's Web content.

Figure 3:
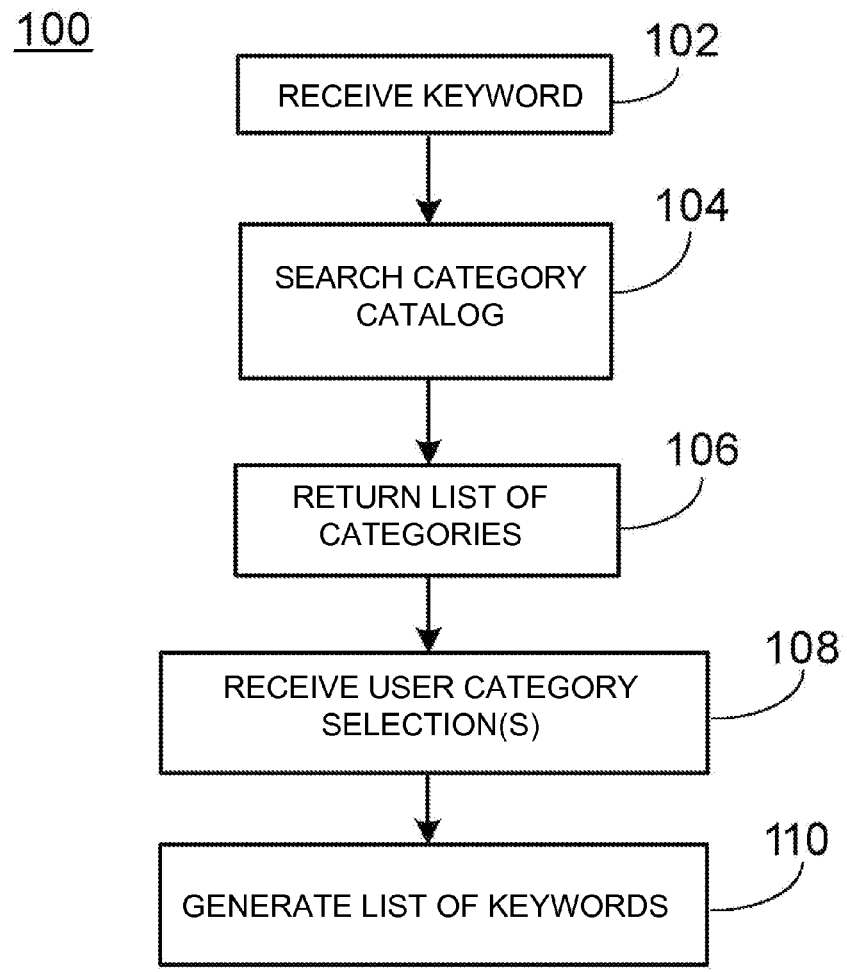
FIG. 3 is a flow diagram of a keyword advisor process that may be used in generating keywords for inclusion in searchable content.

FIG. 3 shows a keyword advisory process 100, which may be used to generate keywords. Referring to FIG. 3, keyword advisor process 100 receives (102) a keyword input, e.g., from search engine 48 or another GUI. Process 100 uses the keyword to search (104) category catalog file 52 for one or more categories associated with the keyword. In this example, process 100 returns (106) a list of categories associated with the keyword. Process 100 displays a list of categories to the user and receives (108) a user selection of one of more categories contained in the displayed list of categories. Process 100 generates (110) a list of keywords associated with the selected category(ies). For example, for each selected category, process 100 may obtain all or part of the keywords associated with that category from catalog file 52. Generating the list of keywords (110) can include providing a relative ranking of the keywords in the list of keywords for each of the selected category(ies). The ranking may be generated using the confidence score, which is described above Selected keywords may then be incorporated into advertising content, as described above.

The processes described herein for suggesting keywords, including process 100, are not limited to use in selecting keywords for advertising. They may be used in any context to suggest keywords. For example, these processes may be used to suggest related search terms to users who are performing Web search(es). That is, a user may enter a search query and the search engine may provide a list of keywords generated by process 100, which may then be used to refine or expand the Web search. These keywords may be ranked in accordance with their confidence scores, as described above.

The various processes described herein (hereinafter, "the processes") can be implemented in digital electronic circuitry, or in computer hardware, firmware, software, or in combinations of them. The processes can be implemented as a computer program product, i.e., a computer program tangibly embodied in an information carrier, e.g., in one or more machine readable storage media or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

The processes can be performed by one or more programmable processors executing a computer program to perform functions of the processes by operating on input data and generating output. The processes can also be performed by, and apparatus that perform the processes can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The processes can be implemented using a computing system that includes a back end component, e.g., as a data server, or that includes a middleware component, e.g., an application server, or that includes a front end component, e.g., a client computer having a graphical user interface or a Web browser through which a user can interact with an implementation of the processes, or any combination of such back end, middleware, or front end components. The components of the system can be interconnected by any form or medium of digital data communication, e.g., a communication network. Examples of communication networks include a LAN and a WAN, e.g., the Internet.

A computing system can include clients and servers. A client and server are generally remote from each other and typically interact through a communication network. The relationship of client and server arises by virtue of computer programs running on the respective computers and having a client-server relationship to each other.

The processes are not limited to use with the particular hardware or software described herein. Rather, the processes can be implemented with any networked device. Likewise, the processes are not limited to the specific network configurations and protocols described herein. Any configurations and protocols may be used.

Elements of different implementations described herein may be combined to form other implementations not specifically set forth above. Other implementations not specifically described herein are also within the scope of the following claims.

What is claimed is:

1. A method performed on a programmable processor, comprising:
    receiving, at the programmable processor, a first keyword entered into a search engine to search for Internet content;
    obtaining, via the programmable processor, categories that corresponds to the first keyword, the categories comprising second keywords that relate to the first keyword, second keywords in the categories having associated confidence scores, where a confidence score represents an indication of how often a keyword is hit within a corresponding category;
    presenting, on a display device, the categories that correspond to the first keyword;
    receiving, at the programmable processor, a selection corresponding to at least one of the categories;
    generating, via the programmable processor, third keywords associated with the selection, wherein generating the third keywords comprises obtaining all or part of the second keywords in the at least one of the categories, and ranking obtained second keywords according to confidence score; and
    incorporating, via the programmable processor, the third keywords into advertising content.

2. The method of claim 1, wherein the first keyword is received via a graphical user interface (GUI).

3. The method of claim 1, wherein the categories are obtained from a catalog file, the catalog file comprises mappings of second keywords to categories, and obtaining categories that correspond to the first keyword comprises retrieving mapped categories from the catalog file that correspond to the first keyword.

4. The method of claim 1, wherein the advertising content comprises searchable content.

5. The method of claim 1, wherein the third keywords are incorporated into metadata associated with the advertising content.

6. The method of claim 1, wherein the third keywords are incorporated into visible content of the advertising content.

7. One or more machine-readable storage media comprising instructions that are executable to cause one or more processing devices to:
- receive a first keyword entered into a search engine to search for Internet content;
- obtain categories that corresponds to the first keyword, the categories comprising second keywords that relate to the first keyword, second keywords in the categories having associated confidence scores, where a confidence score represents an indication of how often a keyword is hit within a corresponding category;
- present the categories that correspond to the first keyword;
- receive a selection corresponding to at least one of the categories;
- generate third keywords associated with the selection, wherein generating the third keywords comprises obtaining all or part of the second keywords in the at least one of the categories, and ranking obtained second keywords according to confidence score; and
- incorporate the third keywords into advertising content.

8. The one or more machine-readable storage media of claim 7, wherein the first keyword is received via a graphical user interface (GUI).

9. The one or more machine-readable storage media of claim 7, wherein the categories are obtained from a catalog file, the catalog file comprises mappings of second keywords to categories, and obtaining categories that correspond to the first keyword comprises retrieving mapped categories from the catalog file that correspond to the first keyword.

10. The one or more machine-readable storage media of claim 7, wherein the advertising content comprises searchable content.

11. The one or more machine-readable storage media of claim 7, wherein the third keywords are incorporated into metadata associated with the advertising content.

12. The one or more machine-readable storage media of claim 7, wherein the third keywords are incorporated into visible content of the advertising content.

13. An apparatus comprising:
- memory to store instructions that are executable; and
- a processing device to execute the instructions to perform the following functions:
  - receiving a first keyword entered into a search engine to search for Internet content;
  - obtaining categories that corresponds to the first keyword, the categories comprising second keywords that relate to the first keyword, second keywords in the categories having associated confidence scores, where a confidence score represents an indication of how often a keyword is hit within a corresponding category;
  - presenting the categories that correspond to the first keyword;
  - receiving a selection corresponding to at least one of the categories;
  - generating third keywords associated with the selection, wherein generating the third keywords comprises obtaining all or part of the second keywords in the at least one of the categories, and ranking obtained second keywords according to confidence score; and
  - incorporating the third keywords into advertising content.

14. The apparatus of claim 13, wherein the first keyword is received via a graphical user interface (GUI).

15. The apparatus of claim 13, wherein the categories are obtained from a catalog file, the catalog file comprises mappings of second keywords to categories, and obtaining categories that correspond to the first keyword comprises retrieving mapped categories from the catalog file that correspond to the first keyword.

16. The apparatus of claim 13, wherein the advertising content comprises searchable content.

17. The apparatus of claim 13, wherein the third keywords are incorporated into metadata associated with the advertising content.

18. The apparatus of claim 13, wherein the third keywords are incorporated into visible content of the advertising content.

* * * * *

UNITED STATES PATENT AND TRADEMARK OFFICE
CERTIFICATE OF CORRECTION

PATENT NO. : 7,620,627 B2
APPLICATION NO. : 11/590668
DATED : November 17, 2009
INVENTOR(S) : William Cava It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 110 days.

Signed and Sealed this

Fourteenth Day of December, 2010

David J. Kappos
*Director of the United States Patent and Trademark Office*